(12) United States Patent
Murali et al.

(10) Patent No.: US 11,290,598 B2
(45) Date of Patent: Mar. 29, 2022

(54) TELECONFERENCE SYSTEM AND TERMINAL APPARATUS

(71) Applicant: FUJIFILM Business Innovation Corp., Tokyo (JP)

(72) Inventors: Suresh Murali, Kanagawa (JP); Sharath Vignesh Godhantaraman, Kanagawa (JP); Akira Sekine, Kanagawa (JP); Shingo Uchihashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 170 days.

(21) Appl. No.: 16/531,127

(22) Filed: Aug. 5, 2019

(65) Prior Publication Data

US 2020/0059561 A1 Feb. 20, 2020

(30) Foreign Application Priority Data

Aug. 16, 2018 (JP) .............................. JP2018-153276

(51) Int. Cl.
*H04M 3/56* (2006.01)
*H04N 7/15* (2006.01)
*G06F 3/16* (2006.01)

(52) U.S. Cl.
CPC ............ *H04M 3/568* (2013.01); *G06F 3/165* (2013.01); *H04M 3/567* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 2005/0276405 A1 | 12/2005 | Fernandes et al. | |
| 2009/0002479 A1* | 1/2009 | Sangberg | H04N 7/147 348/14.02 |
| 2011/0069643 A1 | 3/2011 | Yoakum et al. | |
| 2012/0182384 A1 | 7/2012 | Anderson et al. | |
| 2014/0245192 A1* | 8/2014 | Chavez | G06F 3/04815 715/757 |
| 2016/0323544 A1* | 11/2016 | Wang | H04N 7/15 |

* cited by examiner

*Primary Examiner* — Phung-Hoang J Nguyen
(74) *Attorney, Agent, or Firm* — JCIPRNET (57) ABSTRACT

A teleconference system includes an audio data receiving section, a group information holding section, and an audio controller. The audio data receiving section receives audio data obtained by multiple terminal apparatuses of multiple users who participate in a conference. The group information holding section holds group information indicating multiple groups. The groups are obtained by grouping the users of the terminal apparatuses. Any of the terminal apparatuses is referred to as a certain terminal apparatus. Each of the groups includes one or more users. The audio controller controls volumes of sound output of the audio data independently for the respective groups based on the group information held by the group information holding section. The audio data is received by the audio data receiving section.

1 Claim, 9 Drawing Sheets

TELECONFERENCE SYSTEM AND TERMINAL APPARATUS

CROSS-REFERENCE TO RELATED APPLICATIONS

This application is based on and claims priority under 35 USC 119 from Japanese Patent Application No. 2018-153276 filed Aug. 16, 2018.

BACKGROUND

(i) Technical Field

The present disclosure relates to a teleconference system and a terminal apparatus.

(ii) Related Art

An online conference may be held by using the terminal apparatuses of conference participants connected through a telephone line or the like. Typically, in a conference, some conference participants may form a subgroup, and opinions may be exchanged on a specific topic which diverts from the discussion flows of a different subgroup and the entire conference. U.S. Patent Application Publication No. 2011/0069643A1 discloses a technique of the related art in which, in a telephone conference, private subgroups and public subgroups of conference participants are formed.

When a subgroup is formed in an online teleconference, a conference participant may feel uncomfortable with sounds and videos of a subgroup other than the subgroup in which the conference participant participates.

SUMMARY

Aspects of non-limiting embodiments of the present disclosure relate to a technique of differentiating between outputs from subgroups in an online teleconference and making a user differentiate easily between the subgroup, in which the user participates, and the other subgroups, compared with the configuration enabling subgroups of conference participants to be simply formed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a teleconference system including an audio data receiving section, a group information holding section, and an audio controller. The audio data receiving section receives audio data obtained by multiple terminal apparatuses of multiple users who participate in a conference. The group information holding section holds group information indicating multiple groups. The groups are obtained by grouping the users of the terminal apparatuses. Any of the terminal apparatuses is referred to as a certain terminal apparatus. Each of the groups includes one or more users. The audio controller controls volumes of sound output of the audio data independently for the respective groups based on the group information held by the group information holding section. The audio data is received by the audio data receiving section.

BRIEF DESCRIPTION OF THE DRAWINGS

Exemplary embodiment of the present disclosure will be described in detail based on the following figures, wherein.

DETAILED DESCRIPTION

Referring to the attached drawings, an exemplary embodiment of the present disclosure will be described in detail below.

System Configuration

Figure 1:
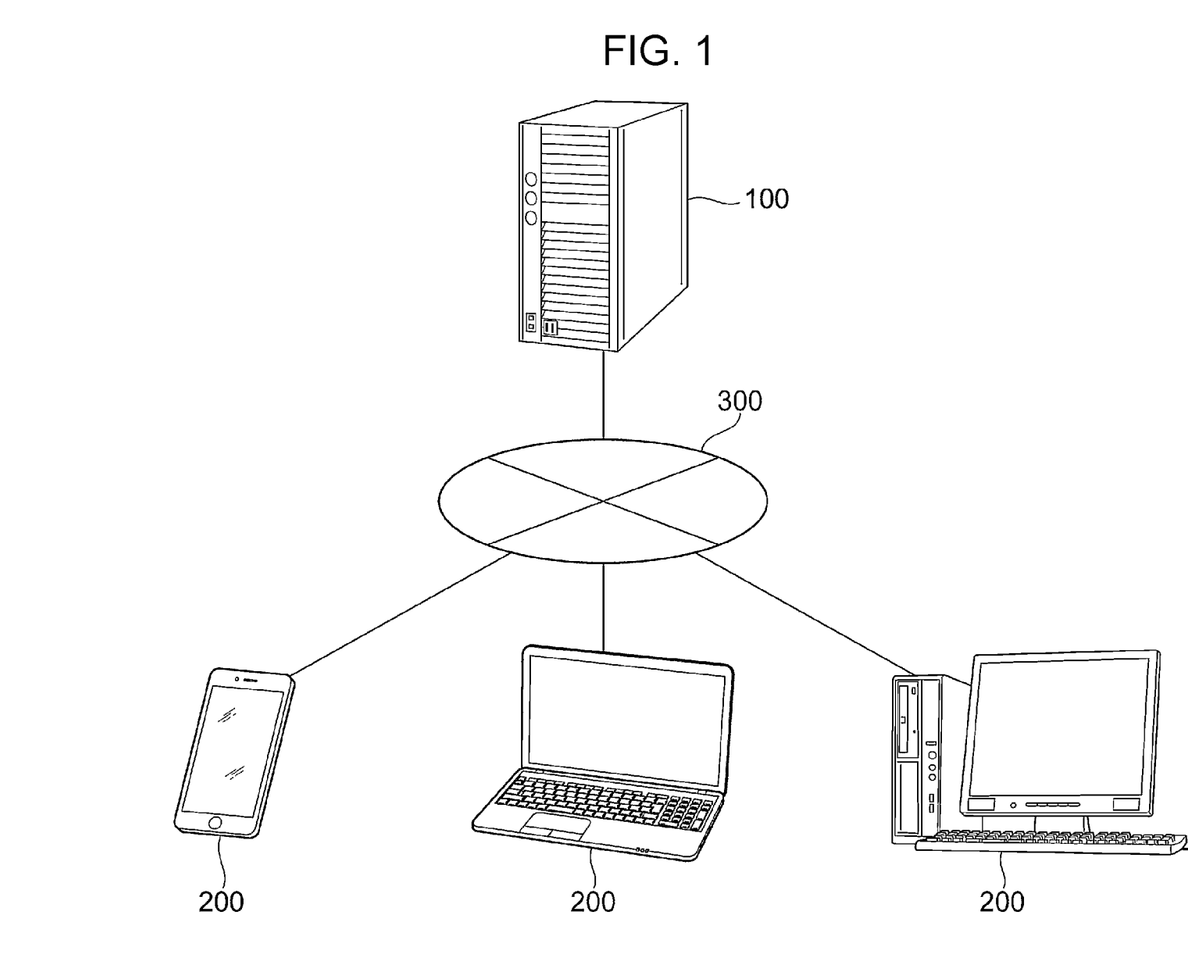
FIG. 1 is a diagram illustrating the entire configuration of a teleconference system according to the exemplary embodiment.

FIG. 1 is a diagram illustrating the entire configuration of a teleconference system according to the exemplary embodiment. The teleconference system includes a server 100 and terminal apparatuses 200 used by conference participants. The server 100 and the terminal apparatuses 200 are connected to one another over a network 300. As long as the network 300 is a communication network used for data communication among the apparatuses so as to implement a teleconference, the network 300 is not particularly limiting. For example, the network 300 may be a local area network (LAN), a wide area network (WAN), or the Internet. A communication line used for data communication may be wired or wireless. Alternatively, both a wired line and a wireless line may be used. In addition, a gateway apparatus and a relay apparatus such as a router may be used to establish a connection among the apparatuses over multiple networks and communication lines. As a line of the network 300 or its part, a telephone line may be used.

Functional Configuration of the Server

Figure 2:
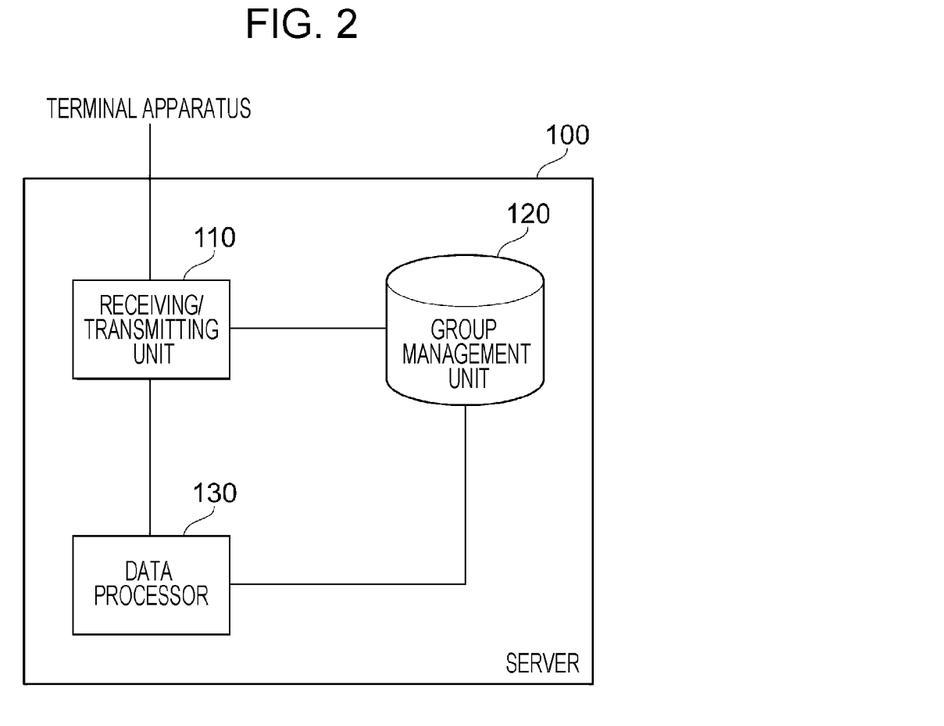
FIG. 2 is a diagram illustrating the functional configuration of a server.

FIG. 2 is a diagram illustrating the functional configuration of the server 100. The server 100 includes a receiving/transmitting unit 110, a group management unit 120, and a data processor 130. The server 100 controls communication among the terminal apparatuses 200 to support a teleconference. The server 100 may be implemented by using a single server machine, or may be implemented through distributed processing using pieces of hardware. The server 100 may be implemented as a so-called cloud server on the Internet.

The receiving/transmitting unit 110 is connected to the terminal apparatuses 200 over the network 300, and receives/transmits audio data and image data obtained by a terminal apparatus 200. The audio data indicates audio digital data including speech sounds of the user (conference participant) using the terminal apparatus 200. The image data indicates digital data of moving images or still images including an image of the user (conference participant) using the terminal apparatuses 200. In the case where the image data is a moving image, the image data may be received/ transmitted as moving image data in which images and sounds are combined together. The receiving/transmitting unit 110 receives group setting information from a terminal apparatus 200. The group setting information is information indicating groups of conference participants which are set by using a terminal apparatus 200. Groups and the group setting information will be described in detail below. The receiving/ transmitting unit 110 includes a network interface for the server 100 establishing a connection to the network 300.

When groups are set in a conference, the group management unit 120 manages the conference participants for each group which is set. In the exemplary embodiment, it is assumed that the conference participants are managed by using identification information of the terminal apparatuses 200 used by the conference participants. That is, the terminal apparatuses 200 used by the conference participants are managed as the conference participants themselves. Hereinafter, assume that the terminal apparatuses 200 in a group represent the conference participants belonging to the group.

The group indicates a group of conference participants which is set by a conference participant and which contains a subset of all of the conference participants. One or more conference participants belong to a group. In addition, each conference participant may belong to multiple groups. Groups are set through an operation performed on a terminal apparatus 200. Other than an operation performed on a terminal apparatus 200, for example, groups are deleted when a conference in which the groups are set ends. The group setting operation will be described below. The group management unit 120 manages the groups and the conference participants, for example, by using a method of registering, in a table in association with each other, identification information of a group which has been set and identification information of the terminal apparatuses 200 used by the conference participants belonging to the group.

The data processor 130 refers to the group management unit 120, and adds, to audio data and image data (or moving image data in which sounds and a moving image are combined together) received from a terminal apparatus 200, the identification information of the group to which the terminal apparatus 200 having transmitted the data belongs. Hereinafter, the identification information of a group is called "group information".

Functional Configuration of a Terminal Apparatus

Figure 3:
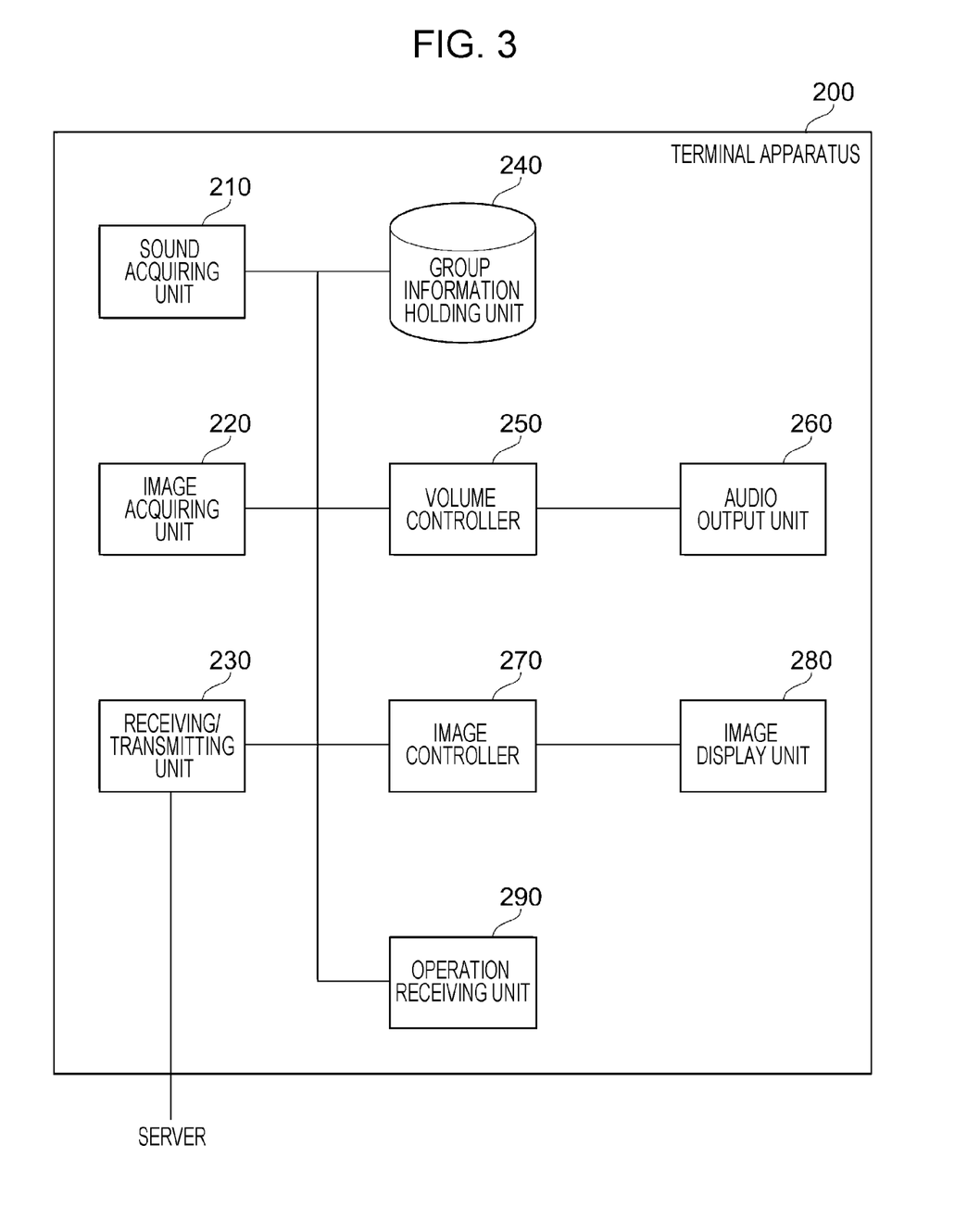
FIG. 3 is a diagram illustrating the functional configuration of a terminal apparatus.

FIG. 3 is a diagram illustrating the functional configuration of a terminal apparatus 200. The terminal apparatus 200 includes a sound acquiring unit 210, an image acquiring unit 220, a receiving/transmitting unit 230, a group information holding unit 240, a volume controller 250, an audio output unit 260, an image controller 270, an image display unit 280, and an operation receiving unit 290. The terminal apparatus 200 receives/transmits, via the server 100, information from/ to the other terminal apparatuses 200 participating in a teleconference. For example, the terminal apparatus 200 is implemented by using a personal computer (PC), a portable terminal apparatus, such as a smartphone or a tablet terminal, or a dedicated terminal having a configuration for a teleconference.

The sound acquiring unit 210 acquires acoustic information including speech sounds of the conference participant using the terminal apparatus 200. The acquired acoustic information is transmitted to the server 100 as digital data. As the sound acquiring unit 210, for example, a microphone provided for the terminal apparatus 200 may be used. Alternatively, audio data obtained by using a microphone provided separately from the terminal apparatus 200 may be received by using a data transfer unit such as Universal Serial Bus (USB).

The image acquiring unit 220 acquires image information including an image of the conference participant using the terminal apparatus 200. The image may be a moving image, or may be a still image. In the case where the image is a moving image, for example, the sounds acquired by the sound acquiring unit 210 are combined with the image. In the case where the image is a moving image, other than moving image data according to a moving image format, the image may have a data structure of a time-series still image data set obtained through shooting at every determined time. The acquired image is transmitted to the server 100 as digital data. As the image acquiring unit 220, for example, a camera provided for the terminal apparatus 200 may be used. Alternatively, an image captured by using a camera provided separately from the terminal apparatus 200 may be received through a data transfer unit such as USB.

The receiving/transmitting unit 230 is connected to the server 100 over the network 300, and receives/transmits audio data and image data. Specifically, the receiving/ transmitting unit 230 transmits, to the server 100, audio data acquired by the sound acquiring unit 210 and image data acquired by the image acquiring unit 220. In addition, the receiving/transmitting unit 230 receives, from the server 100, pieces of audio and image data acquired by terminal apparatuses 200 used by conference participants. The receiving/transmitting unit 230 is an exemplary audio data receiving section, an exemplary image data receiving section, and an exemplary receiving section. The acquired pieces of audio and image data also include data having been transmitted to the server 100 by the terminal apparatus 200. When groups are set in the conference, each piece of audio and image data acquired from the server 100 has additional information about group information of the group to which the corresponding terminal apparatus 200 belongs.

When an operation of setting groups is performed on the terminal apparatus 200, the receiving/transmitting unit 230 transmits the group setting information to the server 100. In contrast, when an operation of setting groups is performed on another terminal apparatus 200, the receiving/transmitting unit 230 receives the group setting information from the server 100. The receiving/transmitting unit 230 is implemented, for example, by using a wireless communication apparatus and a network interface which are provided for the terminal apparatus 200.

When group information has been added to audio data and image data received from the server 100, the group information holding unit 240 extracts the group information, and holds the extracted group information in association with the terminal apparatus 200 having transmitted the audio data and image data. The group information holding unit 240 is implemented, for example, by using a memory such as a random access memory (RAM) and a hard disk device. The group information holding unit 240 is an exemplary group information holding section.

The volume controller 250 controls the audio output volume for audio data received from the server 100. The volume controller 250 controls the audio output volume independently for each group based on the group information. The volume controller 250 controls audio output volumes, at least such that the volume for the group, to which the user (conference participant) of the terminal apparatus 200 belongs, is different from the volumes for the other groups. For example, the volume controller 250 makes sounds of the group, to which the user (conference participant) of the terminal apparatus 200 belongs, louder than sounds of the other groups. In addition, the volume controller 250 may receive settings for audio output volume individually for the groups. In this case, the operation receiving unit 290 described below receives an operation of setting volumes, and the volume controller 250 controls volumes individually for the groups in accordance with the received operation. This configuration enables a conference participant to set the audio output volume manually for each group, which is set in the conference, in accordance with the participant's preference. The volume controller 250 is implemented, for example, by using an arithmetic unit such as a central processing unit (CPU) under control using programs. The volume controller 250 is an exemplary audio controller.

The audio output unit 260 outputs the sounds of audio data received from the server 100, under control exerted by the volume controller 250. When groups are set in a conference, the audio output unit 260 outputs sounds in such a manner that the volume of sounds for the group, to which the user (conference participant) of the terminal apparatus 200 belongs, is different from the volumes of sounds for the other groups. For example, the audio output unit 260 outputs sounds in such a manner that the volume of sounds for the group, to which the user (conference participant) of the terminal apparatus 200 belongs, is higher than the volumes of sounds of the other groups. When the volume controller 250 controls the audio output volumes according to the volume settings which are set by the user (conference participant), the audio output unit 260 outputs sounds at volumes which are set individually for the groups. The audio output unit 260 is implemented, for example, by using a speaker which is provided for the terminal apparatus 200 or which is connected to the terminal apparatus 200. The audio output unit 260 is an exemplary audio output section.

The image controller 270 controls the display form of an image based on image data received from the server 100. The image controller 270 controls the image display form independently for each group based on the group information. The image controller 270 controls display of images, at least such that the display form for the group, to which the user (conference participant) of the terminal apparatus 200 belongs, is different from the display forms for the other groups. For example, the image controller 270 controls the display forms so that images for the other groups have visibility lower than those for the group, to which the user (conference participant) of the terminal apparatus 200 belongs. The method used to decrease visibility is not particularly limiting. Examples of the method may include making an image out of focus, decreasing the brightness of an image, decreasing the contrast of an image, and decreasing the saturation of an image. The image controller 270 may receive settings for the image display form individually for each group. In this case, the operation receiving unit 290 described below receives an operation of setting image display forms, and the image controller 270 controls the image display forms individually for the groups in accordance with the received operation. This configuration enables a conference participant to manually set the image display form for each group, which is set in the conference, in accordance with the participant's preference. The image controller 270 is implemented, for example, by using an arithmetic unit such as a CPU under control using programs. The image controller 270 is an exemplary image controller.

The image controller 270 causes the image display unit 280 to display an operation screen for receiving operations performed by the user (conference participant) of the terminal apparatus 200. Operation screens are prepared in accordance with the types of operations received by the terminal apparatus 200. For example, a group setting screen used for an operation of setting groups, a volume setting screen used for an operation of setting the audio output volume for each group, and an image setting screen used for an operation of setting the image display form for each group are prepared.

The image display unit 280 displays the images of conference participants based on image data received from the server 100, under control exerted by the image controller 270. When groups are set in the conference, the image display unit 280 displays images in such a manner that the display form of images for the group, to which the user (conference participant) of the terminal apparatus 200 belongs, is different from the display forms for the other groups. For example, the image display unit 280 displays images in such a manner that the display form of images for the group, to which the user (conference participant) of the terminal apparatus 200 belongs, has visibility higher than the display forms of images for the other groups. When the image controller 270 controls the image display forms in accordance with settings made by the user (conference participant), the image display unit 280 displays images in the display forms which are set individually for the groups. The image display unit 280 is implemented, for example, by using a display apparatus which is provided for the terminal apparatus 200 or which is connected to the terminal apparatus 200. The image display unit 280 is an exemplary display section.

The operation receiving unit 290 receives an operation performed by the user (conference participant) of the terminal apparatus 200 who uses an operation device. The operation receiving unit 290 is implemented, for example, by using an arithmetic unit such as a CPU under control using programs. As operation devices, for example, a pointing device such as a mouse, a keyboard, and a touch panel are used. The image display unit 280 displays an operation screen under control exerted by the image controller 270. The user (conference participant) of the terminal apparatus 200 operates an operation device in accordance with an operation screen displayed on the image display unit 280, thus enabling various types of input operations to be performed in accordance with the operation screen. That is, the image display unit 280 and the operation receiving unit 290 provide an operation unit using a graphical user interface (GUI) to the user (conference participant) of the terminal apparatus 200. For example, when the group setting screen is displayed on the image display unit 280, the GUI receives a group setting operation. Similarly, when the volume setting screen is displayed on the image display unit 280, the GUI receives an operation of setting the audio output volume for each group. When the image setting screen is displayed on the image display unit 280, the GUI receives an operation of setting the image display form for each group. The image display unit 280 and the operation receiving unit 290 are an exemplary volume-setting-operation receiving section, an exemplary display-form-setting-operation receiving section, an exemplary group setting section, an exemplary volume setting section, and an exemplary image setting section.

Operations of the Server

Figure 4:
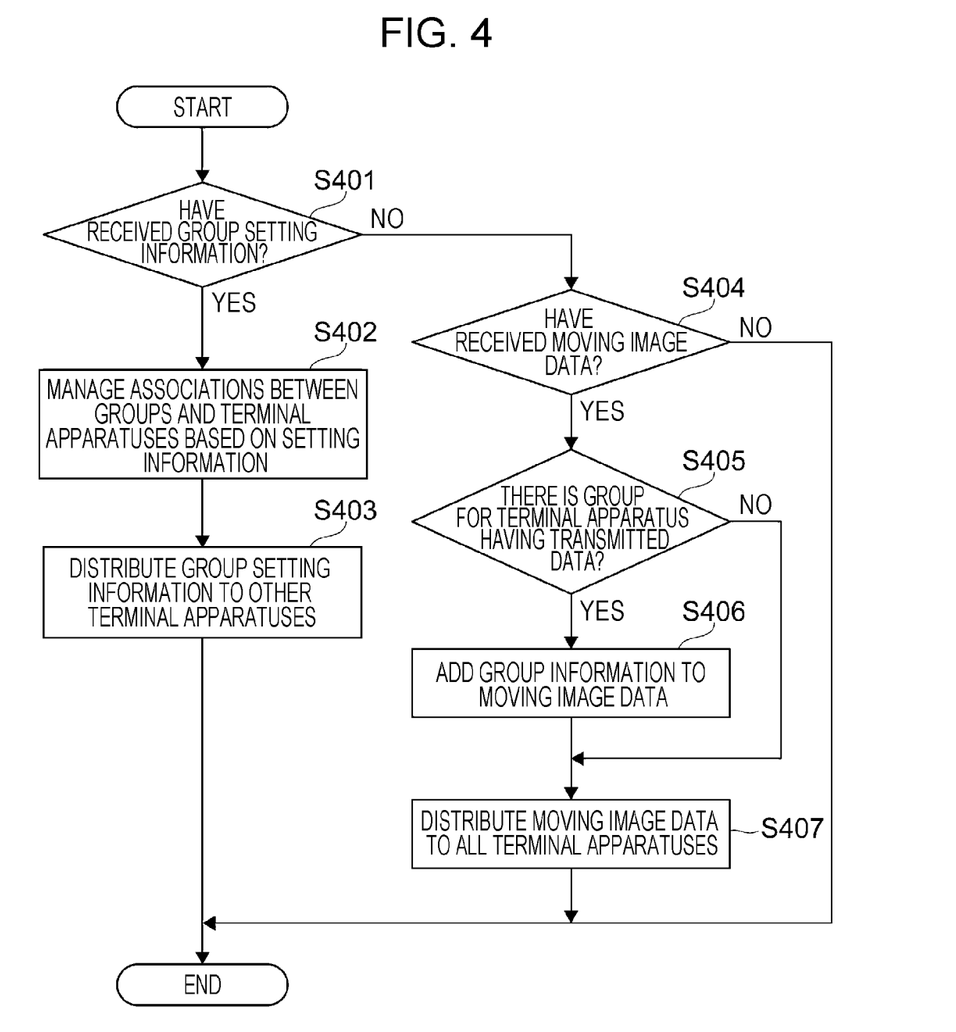
FIG. 4 is a flowchart of operations performed by a server.

FIG. 4 is a flowchart of operations performed by the server 100. In the operation example described below, the operations performed by the server 100 will be described by taking, as an example, the case in which moving images, in which images and sounds are combined together, are used in a teleconference. When the server 100 receives group setting information from a terminal apparatus 200, the server 100 stores the acquired group setting information in the group management unit 120, and manages associations between the groups and the terminal apparatuses 200 (users). (S401 and S402). The server 100 distributes the managed group setting information to the terminal apparatuses 200 other than the terminal apparatus 200 having transmitted the group setting information (S403).

When the server 100 receives moving image data, including images and sounds, from a terminal apparatus 200, the server 100 asks the group management unit 120 whether or not there is a group to which the terminal apparatus 200 (user) having transmitted the moving image data belongs (S401, S404, and S405). When there is such a group (Yes in S405), the data processor 130 adds the corresponding group information to the moving image data (S406). The server 100 distributes the moving image data, to which the group information has been added, to all of the terminal apparatuses 200 participating in the teleconference (S407). In contrast, if there is not such a group (No in S405), the server 100 does not add group information to the moving image data, and distributes the moving image data to all of the terminal apparatuses 200 participating in the teleconference (S407).

As described above, the example in which moving images are used in a teleconference is described. In the case where still images and sounds are used in a teleconference, when the server 100 receives still image data and audio data in S404, the server 100 checks if there is a group for the data in S405. In S406, the server 100 adds the group information to the still image data and audio data. In S407, the server 100 distributes the still image data and audio data, to which the group information has been added, to the terminal apparatuses 200.

In the case where only sounds are used in a teleconference, when the server 100 receives audio data in S404, the server 100 checks if there is a group for the data in S405. In S406, the server 100 adds the group information to the audio data. In S407, the server 100 distributes the audio data, to which the group information has been added, to the terminal apparatuses 200.

Operations Performed by a Terminal Apparatus

Figure 5:
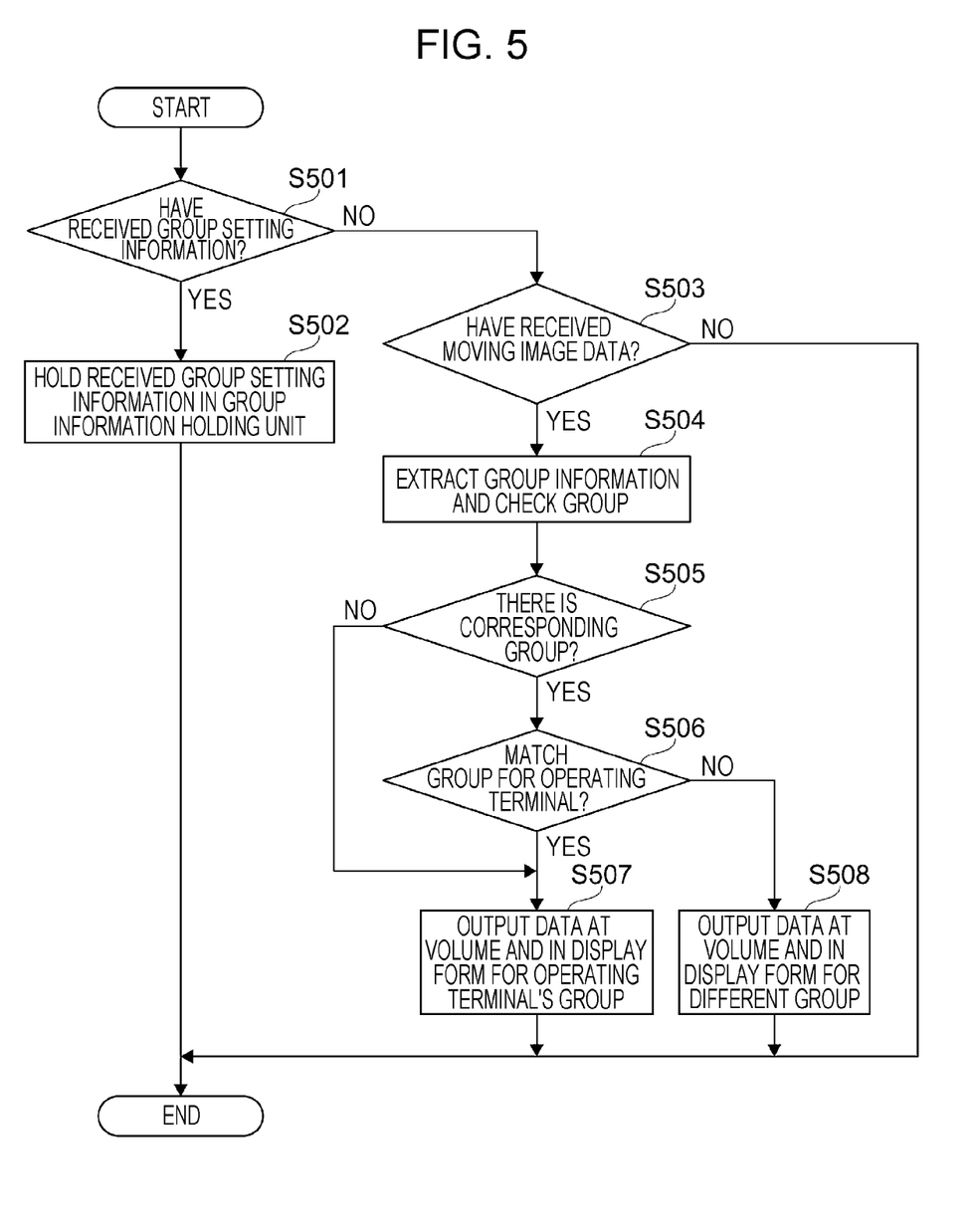
FIG. 5 is a flowchart of operations performed by a terminal apparatus.

FIG. 5 is a flowchart of operations performed by a terminal apparatus 200. When the terminal apparatus 200 receives group setting information from the server 100, the terminal apparatus 200 stores the received group setting information in the group information holding unit 240 (S501 and S502).

When the terminal apparatus 200 receives moving image data, the terminal apparatus 200 extracts the group information from the received moving image data, and refers to the group setting information, which is stored in the group information holding unit 240, to check if there is the group to which the terminal apparatus 200 having transmitted the moving image data belongs (S501, S503, and S504). If there is such a group (Yes in S505), and if the found group matches the group to which the operating terminal apparatus 200 belongs (Yes in S506), the volume controller 250 and the image controller 270 of the terminal apparatus 200 output the moving image at the volume and in the display form which are set for the terminal apparatus 200's group (the group to which the operating terminal apparatus 200 belongs) (S507). In contrast, if the found group, to which the terminal apparatus 200 having transmitted the moving image data belongs, does not match the terminal apparatus 200's group (No in S506), the volume controller 250 and the image controller 270 of the terminal apparatus 200 output the moving image at the volume and in the display form which are set for the other group (different group) other than the terminal apparatus 200's group (S508). In the case where there are multiple different groups and where the volume and the image display form are set for each different group individually, the terminal apparatus 200 outputs the moving image at the volume and in the image display form which are set for the corresponding one of the different groups.

If there is no group to which the terminal apparatus 200 having transmitted the moving image data belongs (No in S505), the volume controller 250 and the image controller 270 of the terminal apparatus 200 output the moving image at the volume and in the image display form which are set for the terminal apparatus 200's group (S507). As the case in which there is no group to which the terminal apparatus 200 having transmitted the moving image data belongs, there are two cases: the case in which there is no group corresponding to the group information extracted from the moving image data; and the case in which group information has not been added to the moving image data. The latter case includes the case in which the terminal apparatus 200 having transmitted the moving image data does not belong to any group, and the case in which no groups have been set.

As described above, the example in which moving images are used in a teleconference is described. In the case where still images and sounds are used in a teleconference, when the terminal apparatus 200 receives still image data and audio data in S503, the terminal apparatus 200 extracts the group information and checks the group in S504. If the checked group matches the terminal apparatus 200's group, the terminal apparatus 200 outputs the still images and sounds at the volume and in the image display form which are set for the terminal apparatus 200's group, in S507. In contrast, if the checked group matches a different group, the terminal apparatus 200 outputs the still images and sounds at the volume and in the image display form which are set for the corresponding different group, in S508.

In the case where only sounds are used in a teleconference, when the terminal apparatus 200 receives audio data in S503, the terminal apparatus 200 extracts the group information and checks the group in S504. If the checked group matches the terminal apparatus 200's group, the terminal apparatus 200 outputs the sounds at the volume which is set for the terminal apparatus 200's group, in S507. In contrast, if the checked group matches a different group, the terminal apparatus 200 outputs the sounds at the volume which is set for the corresponding different group, in S508.

Exemplary Operation Screens

Operation screens used for operations on the terminal apparatus 200 will be described. As exemplary operation screens, the group setting screen, the volume setting screen, and the image setting screen will be described.

Figure 6:
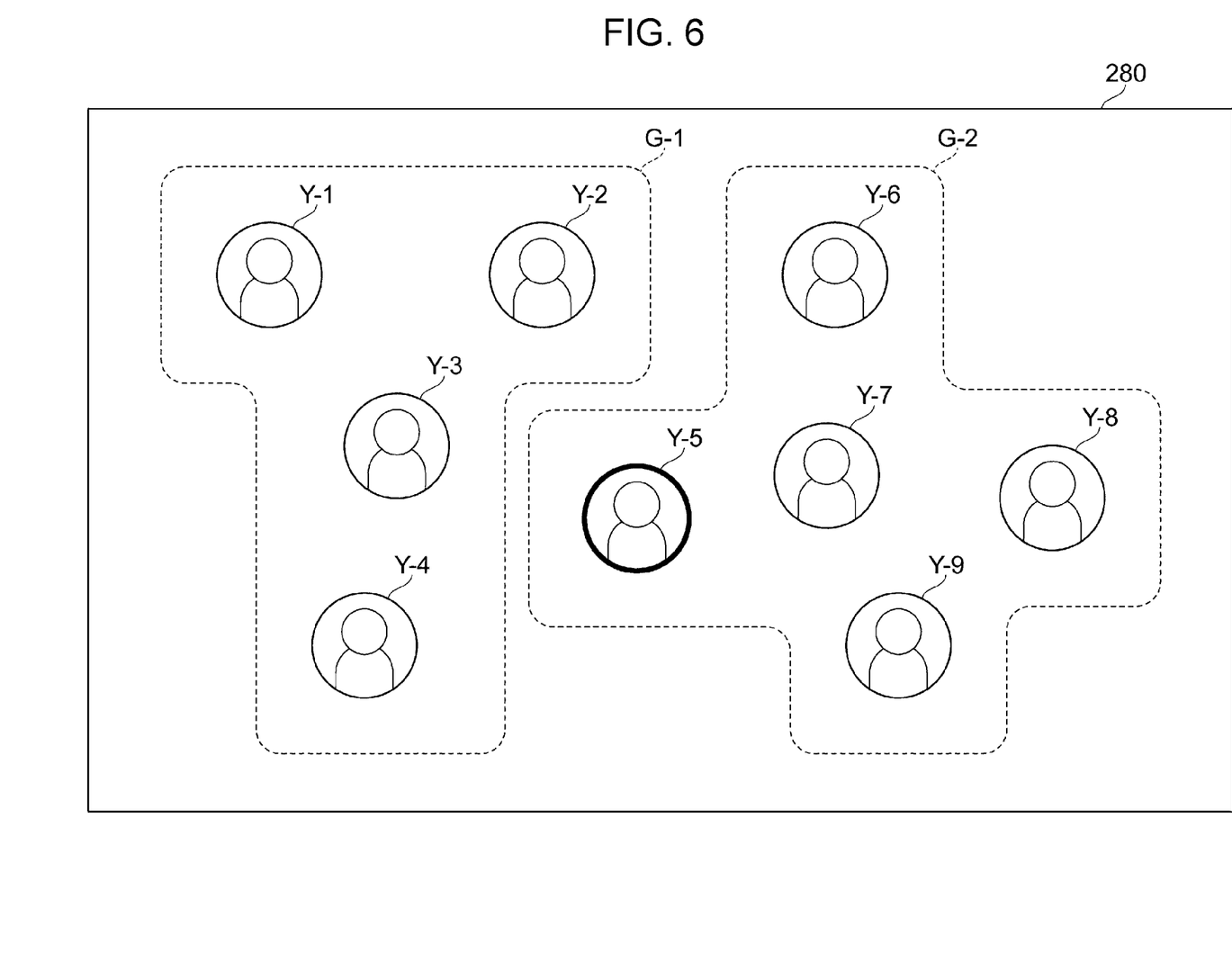
FIG. 6 is a diagram illustrating an exemplary group setting screen.

FIG. 6 is a diagram illustrating an exemplary group setting screen. In the example in FIG. 6, the images of conference participants are displayed on the image display unit 280 of a terminal apparatus 200. On the group setting screen illustrated in FIG. 6, the images (hereinafter referred to as participant images) Y-1 to Y-9 of nine conference participants are illustrated. Each of the participant images Y-1 to Y-9 is obtained by processing an image acquired by the image acquiring unit 220 of the terminal apparatus 200 of the corresponding conference participant. Among the participant images Y-1 to Y-9 illustrated in the group setting screen in FIG. 6, the participant image Y-5 is an image indicating the user of the terminal apparatus 200 (the operating apparatus) on which the group setting screen is displayed. The participant image Y-5 is displayed so as to be differentiated from the other participant images Y-1 to Y-4 and Y-6 to Y-9. In the group setting screen in FIG. 6, the participant images Y-1 to Y-9 are disposed randomly. The arrangement of the participant images Y-1 to Y-9 on the group setting screen is not limited to the example in FIG. 6. For example, arrangement in a grid in the horizontal and vertical directions may be used. For example, the image controller 270 of the terminal apparatus 200, on which the group setting screen is displayed, is in charge of processing the participant images Y-1 to Y-9 and arranging the participant images Y-1 to Y-9 on the group setting screen.

When a group setting operation is performed in the group setting screen in FIG. 6, the conference participants are grouped in accordance with the operation. In the example in FIG. 6, the group G-1 including the participant images Y-1 to Y-4 and the group G-2 including the participant images Y-5 to Y-9 are formed. In the group setting operation, each of the conference participants may be allowed to be grouped into any group, or each terminal apparatus 200 may be subject to a restriction that the user (conference participant) of the terminal apparatus 200 is allowed to set only their group. As long as the group setting operation is an operation of partitioning the participant images displayed on the group setting screen, any operation may be employed, and a specific operation method is not particularly limiting. For example, a pointing device may be used to draw a line for partitioning the participant images displayed on the group setting screen. Alternatively, a pointing device and a keyboard may be used to specify, for each group, the participant images of conference participants who are to belong to the group.

It is assumed that, when one group is set in the group setting operation, the conference participants who are not included in the set group form the other group. For example, when the group G-1 including the participant images Y-1 to Y-4 is set on the group setting screen in FIG. 6, the group G-2 including the remaining participant images Y-5 to Y-9 is formed automatically. In the state illustrated in FIG. 6, for example, when a group including the participant images Y-1 to Y-3 is set, a new group including only the participant image Y-4 is set.

In the example in FIG. 6, each conference participant (each of the participant images Y-1 to Y-9) belongs to the corresponding, single group. In contrast, one conference participant may be allowed to belong to multiple groups. For example, when a new group including the participant images Y-2, Y-5, and Y-6 is set in FIG. 6, instead of removing the participant image Y-2 from the group G-1 and removing the participant images Y-5 and Y-6 from the group G-2, the new group may be set while the participant images belong to their original groups.

Figure 7:
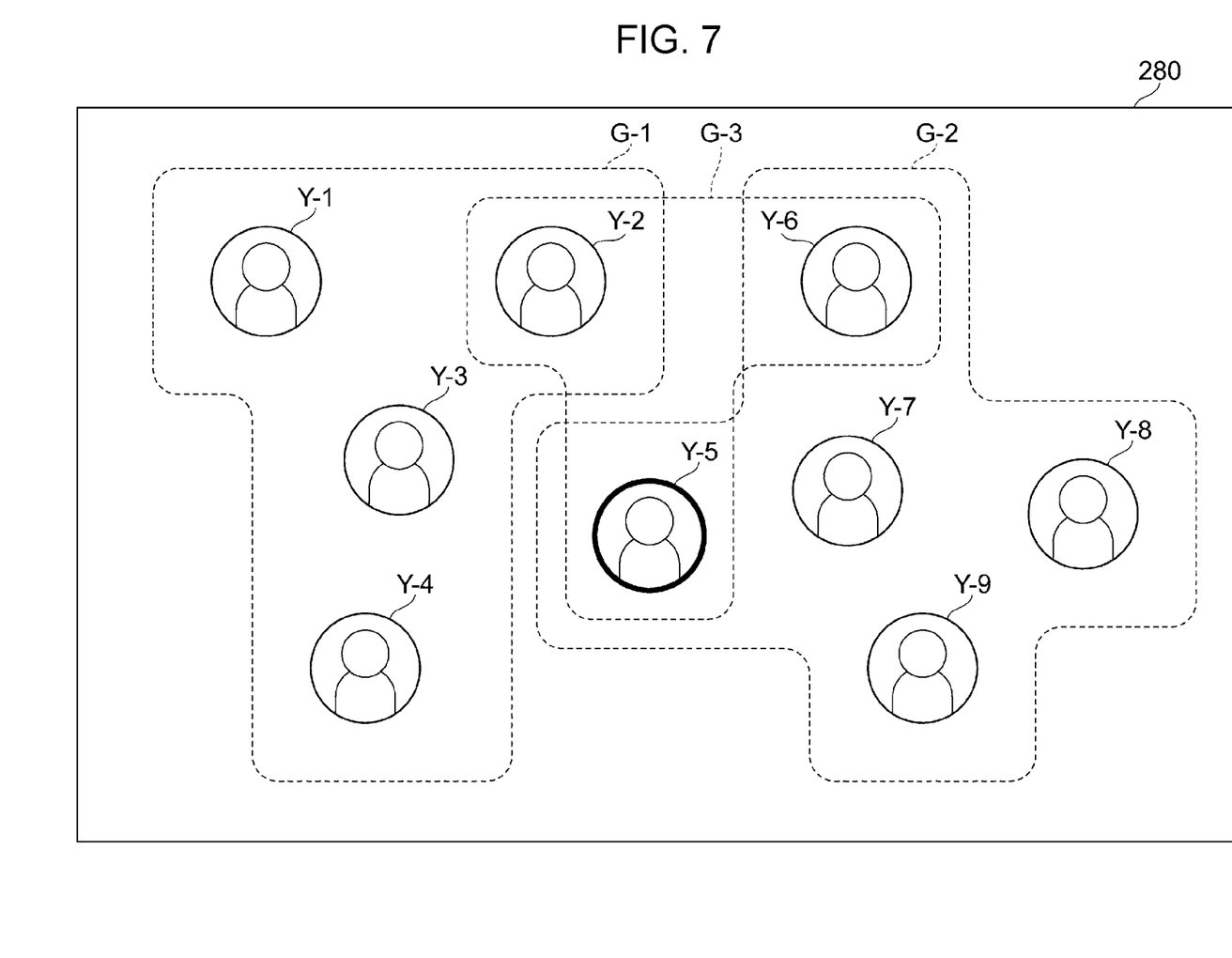
FIG. 7 is a diagram illustrating another exemplary group setting screen.

FIG. 7 is a diagram illustrating another exemplary group setting screen. In the example in FIG. 7, the group G-3 is set so as to overlap the groups G-1 and G-2 in FIG. 6. Thus, the conference participant for the participant image Y-2 belongs to the group G-1 and the group G-3, and the conference participants for the participant images Y-5 and Y-6 belong to the group G-2 and the group G-3. As the volume of sounds of a conference participant belonging to multiple groups, for example, the highest volume among the groups, to which the conference participant belongs, is used. As the image display form for a conference participant belonging to multiple groups, for example, the display form having the highest visibility among the groups, to which the conference participant belongs, is used.

The group setting screen illustrated in FIGS. 6 and 7 may be used as a standard screen in a teleconference because the image of each conference participant and the groups, to which the conference participant belongs, are clearly indicated. When the group setting screen is used as the standard screen in a teleconference, setting of a new group may be restricted. In this case, when a new group is to be set, for example, the restriction of the group setting operation may be removed through an operation using a pop-up menu so that an operation of setting a new group is acceptable.

Figure 8:
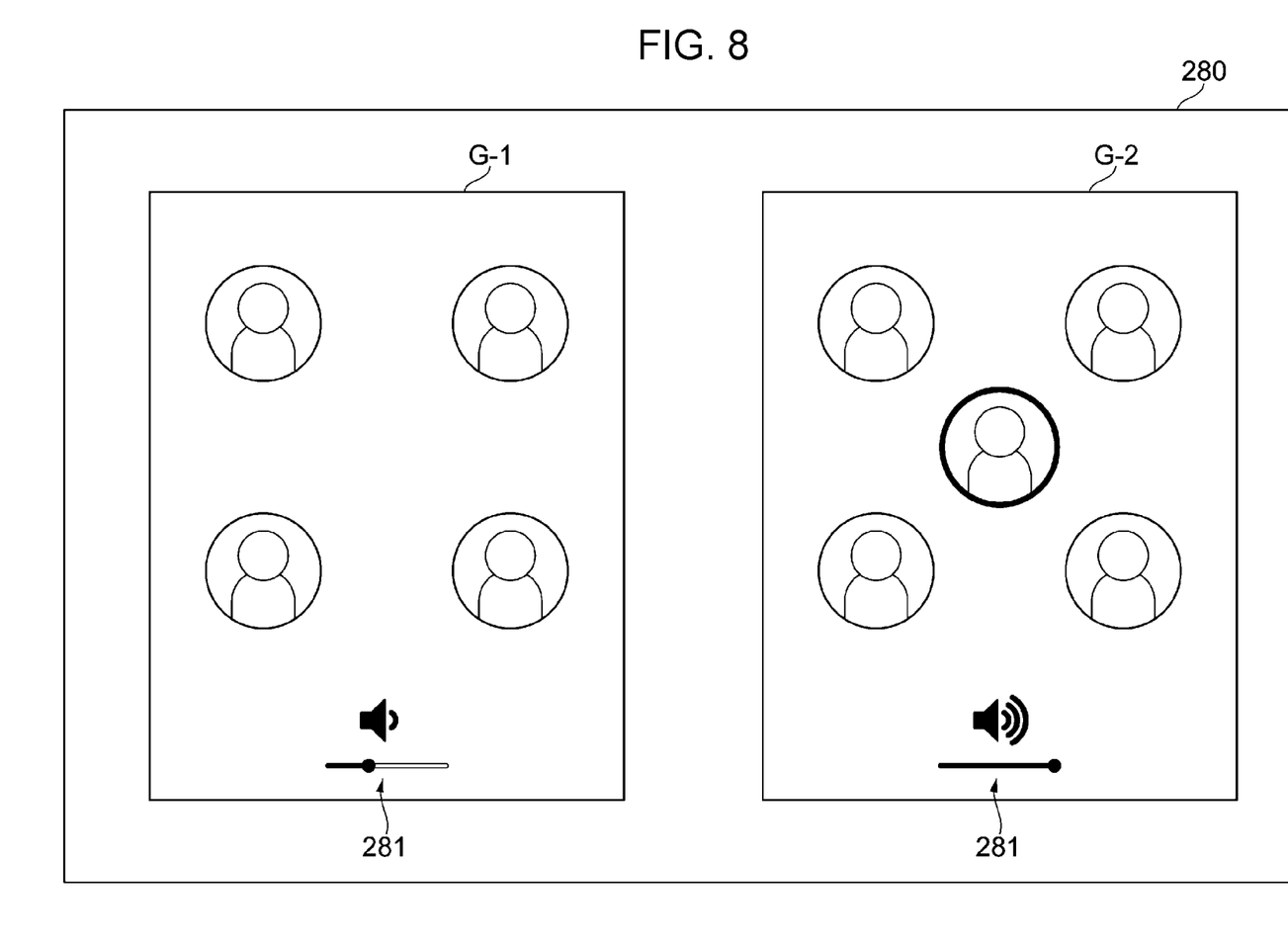
FIG. 8 is a diagram illustrating an exemplary volume setting screen.

FIG. 8 is a diagram illustrating an exemplary volume setting screen. In the example in FIG. 8, objects 281 for volume operation are displayed for the groups G-1 and G-2, respectively. For each group, the user of the terminal apparatus 200 may operate the corresponding object 281 to set a desirable volume in the settable range. In the example in FIG. 8, the outer frame of the participant image of the user (conference participant) of the terminal apparatus 200 is illustrated by using a bold line. That is, in the example in FIG. 8, the user of the terminal apparatus 200 belongs to the group G-2. In this case, the range of the volume settable for the group G-1, to which the user of the terminal apparatus 200 does not belong, may be limited relative to the range of the volume settable for the group G-2. After groups are set, before the user of the terminal apparatus 200 performs an operation, initial setting may be performed so that the volume for the group (in the example in FIG. 8, the group G-2), to which the user of the terminal apparatus 200 belongs, is higher than the volumes for the other groups.

In the volume setting screen in FIG. 8, compared with the group setting screen in FIGS. 6 and 7, the participant images in each group are disposed systematically. Thus, in the volume setting screen, the arrangement of the participant images may be changed so that groups, for which volume setting is to be performed individually, are easily recognized. Alternatively, while the participant images are arranged as in the standard screen used in a teleconference, an object for volume operation may be displayed for each group, for example, in pop-up display, and an operation of setting a volume may be received. A transition from the standard screen used in a teleconference to the volume setting screen is performed, for example, by selecting the transition to the volume setting screen through an operation on a pop-up menu or the like.

Figure 9A:
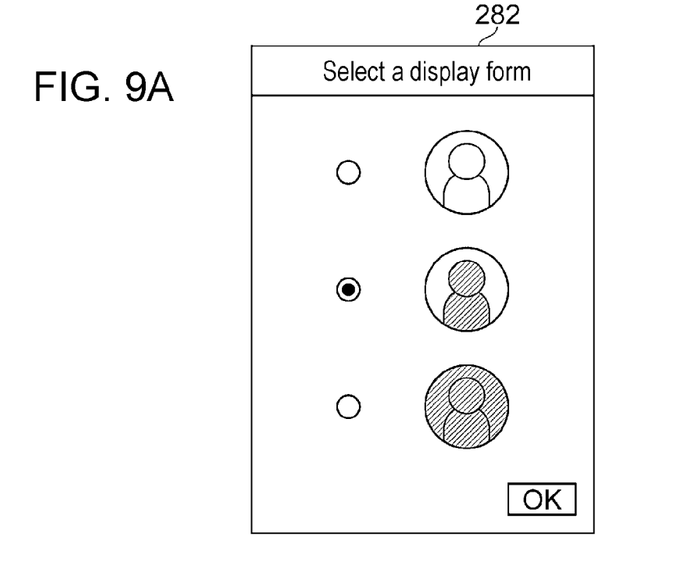
FIGS. 9A and 9B are diagrams illustrating an exemplary image setting screen.
Figure 9B:
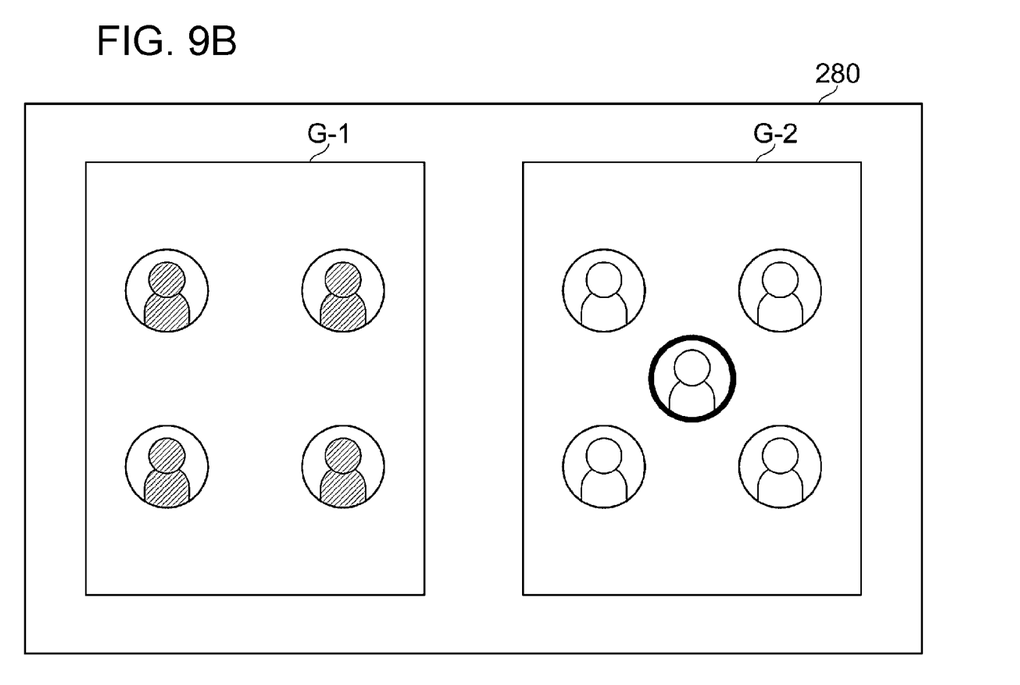

FIGS. 9A and 9B are diagrams illustrating an exemplary image setting screen. FIG. 9A is a diagram illustrating an object for setting the display form of a participant image. FIG. 9B is a diagram illustrating a state in which a different display form has been set for each group. In the image setting screen, for example, a group, for which the display form is to be set, is selected on the screen as illustrated in FIG. 9B, and an object 282 for setting as illustrated in FIG. 9A is displayed. Selection of a group and display of the object 282 are performed, for example, by specifying an appropriate position in the group by using a pointing device and selecting the function through an operation on a pop-up menu. In the object 282 in FIG. 9A, the display forms selectable for a participant image are displayed, in line, with radio buttons for selection. In the example in FIGS. 9A and 9B, the second display form from the top is selected in the object 282 in FIG. 9A, and the participant images belonging to the group G-1 are displayed in the selected display form as illustrated in FIG. 9B. For example, the object 282 may be displayed on the image setting screen in FIG. 9B, or may be displayed on the display screen of the image display unit 280, as a window different from the display window of the image setting screen.

Similarly to the volume setting screen in FIG. 8, in the image setting screen in FIG. 9B, the participant images in each group are displayed systematically. Alternatively, the participant images may be arranged as in the standard screen used in a teleconference. A transition from the standard screen used in a teleconference to the image setting screen is performed, for example, by selecting the transition to the image setting screen through an operation on a pop-up menu or the like. In the example in FIGS. 9A and 9B, the outer frame of the participant image of the user (conference participant) of the terminal apparatus 200 is illustrated by using a bold line. That is, in the example in FIGS. 9A and 9B, the user of the terminal apparatus 200 belongs to the group G-2. In this case, the selectable display forms for the participant images in the group G-1, to which the user of the terminal apparatus 200 does not belong, may be limited relative to the selectable display forms for the participant images in the group G-2.

In the exemplary operations in FIGS. 4 and 5, the case in which moving images are used in a teleconference is described as an example. As described above, still images and sounds, or only sounds, may be used in a teleconference according to the exemplary embodiment. In the case where moving images are used in a teleconference, a moving image transmitted from the terminal apparatus 200 of each conference participant is used as a participant image described by referring to FIGS. 6 to 9B. A moving image serving as a participant image is reduced in size for display so that the images of conference participants may be displayed on the image display unit 280 of the terminal apparatus 200.

In the case where still images and sounds are used in a teleconference, a still image transmitted from the terminal apparatus 200 of each conference participant is used as a participant image described by referring to FIGS. 6 to 9B. A still image serving as a participant image is reduced in size for display so that the images of conference participants may be displayed on the image display unit 280 of the terminal apparatus 200. When a still image used as a participant image is not transmitted from the terminal apparatus 200 of a conference participant, an image (initially-set image) specified in the initial setting may be displayed as the participant image. In this case, if images for identifying individual conference participants are prepared in advance, the images may be used as initially-set images. If images for identifying conference participants are not prepared, an uncharacteristic image indicating the conference participants and identification information (such as the name and the ID) for identifying each conference participant may be displayed as a participant image.

In the case where only sounds are used in a teleconference, images which indicate the respective conference participants and which are specified in advance in the initial setting are used as participant images described by referring to FIGS. 6 to 9B. As long as the images indicate the respective conference participants, any images may be used, and the type of the images is not particularly limiting. For example, a photograph of a conference participant may be used, and a character image or icon for identifying a participant may be used. Alternatively, an uncharacteristic image indicating the conference participants and identification information (such as the name and the ID) for identifying each conference participant may be displayed as a participant image.

The exemplary embodiment of the present disclosure is described above. The technical scope of the present disclosure is not limited to the exemplary embodiment described above. For example, in a most part of the above description about the exemplary embodiment, the case in which moving images, in which images and sounds are combined together, are used in a teleconference is described as an example. Also in a teleconference using only sounds, the volume control described above may be performed for each group, and control of the display form of an image (such as a still image or an icon) indicating a conference participant may be performed for each group. In this case, the data processor 130 of the server 100 functions as a processor for processing audio data acquired from a terminal apparatus 200.

The configurations of the various types of setting screens are merely exemplary. As long as the following functions may be performed, any user interfaces using various different configurations may be used: setting and display of groups of conference participants; volume control for each group; and control of the image display form for each group. In addition, the present disclosure encompasses various changes and configuration replacements which are made without departing from the technical scope of the present disclosure.

What is claimed is:

1. A terminal apparatus comprising:
a receiving section that receives image data of a plurality of users who participate in a conference;
a group setting section that sets a plurality of groups for the plurality of users, each of the plurality of groups including one or more users;
a display section that displays images of the plurality of users in such a manner that, among the plurality of groups being set by the group setting section, a display form of an image of a user in a certain group is different from a display form of an image of a user in a different group, the certain group including at least a user of the terminal apparatus; and
an image setting section that enables the image display forms to be set individually for the plurality of groups, after the group setting section sets the plurality of groups; wherein, among the plurality of groups being set by the group setting section, a range of settable image display forms for the certain group is different from a range of settable image display forms for the different group, the certain group including at least the user of the terminal apparatus, the settable display forms indicating display forms settable by the image setting section.

* * * * *